April 28, 1931.   H. B. HULL   1,802,513
REFRIGERATING APPARATUS
Filed Dec. 29, 1928
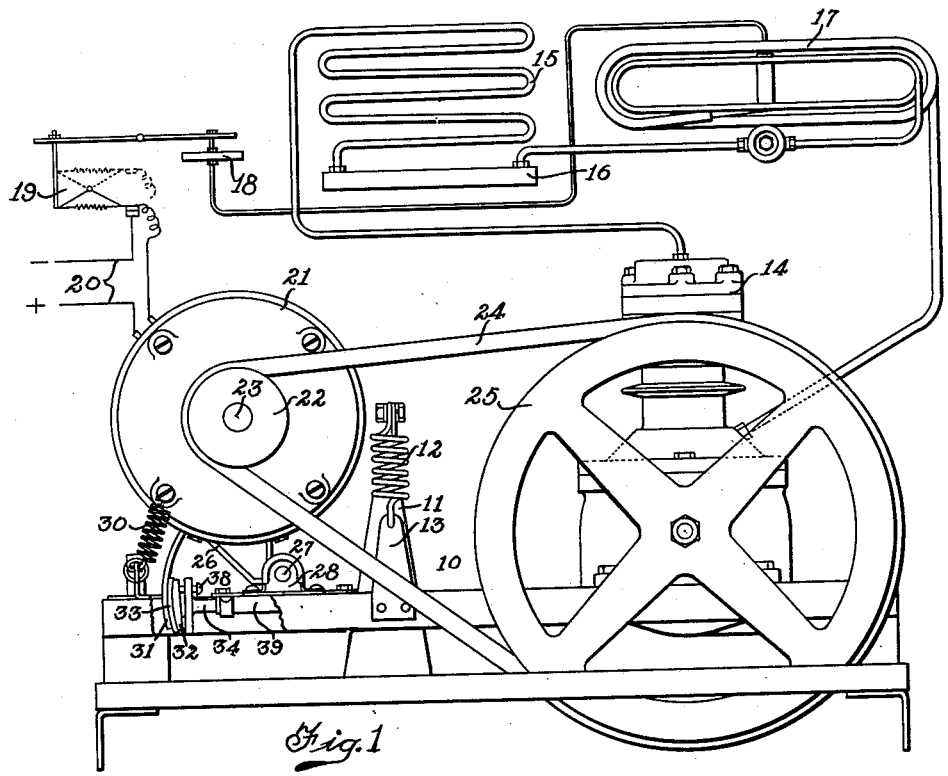
Fig.1
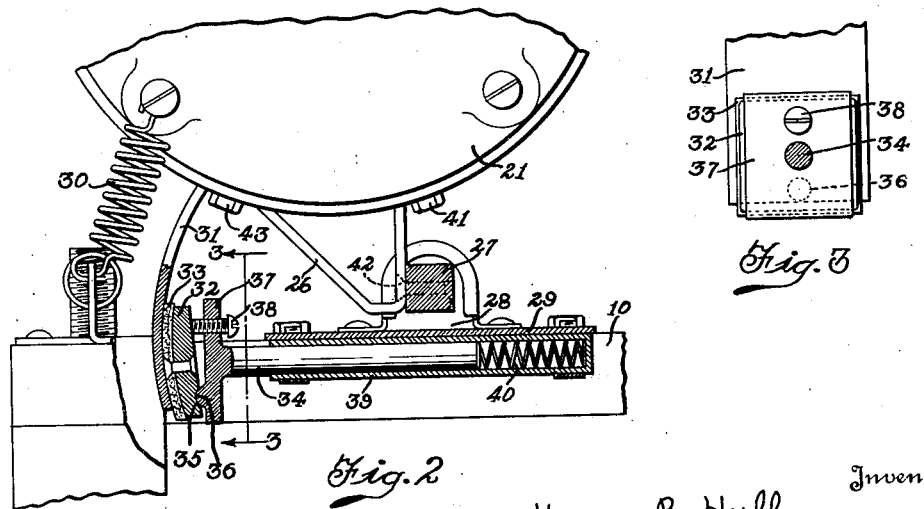
Fig.2
Fig.3
Inventor
Harry B. Hull.
By Spencer, Hardman + Fehr
Attorneys Patented Apr. 28, 1931

1,802,513

UNITED STATES PATENT OFFICE

HARRY B. HULL, OF DAYTON, OHIO, ASSIGNOR TO FRIGIDAIRE CORPORATION, OF DAYTON, OHIO, A CORPORATION OF DELAWARE

REFRIGERATING APPARATUS

Application filed December 29, 1928. Serial No. 329,284.

This invention relates to refrigerating apparatus and especially to the transmission means between the motor and compressor of said refrigerating apparatus.

An object of the invention is to maintain a belt between the motor and compressor tight so that the compressor may be efficiently driven.

Another object is to allow the motor to automatically take up the slack in the belt by allowing it to move away from the compressor.

Another object is to prevent the motor from tilting towards the compressor and thus loosen the belt.

Further objects and advantages of the present invention will be apparent from the following description, reference being had to the accompanying drawings, wherein a preferred form of the invention is clearly shown.

In the drawings:

Fig. 1 discloses a refrigerating system to which the invention is applied.

Fig. 2 is an enlarged view of the invention as applied to the refrigerating apparatus disclosed in Fig. 1.

Fig 3 is a view taken on line 3—3 of Fig. 2.

The refrigerating system to which the invention is applied is disclosed in Fig. 1. A platform 10 is floatingly mounted and supported at its center of oscillation by the bracket 11, spring 12 and plate 13. A compressor or driven member 14 is supported on this platform and connected to a condenser 15. The condenser forwards the refrigerant to the receiver 16 and thence to the evaporator 17 from where it is returned to the compressor 14. The motor or driving member 21 is controlled by the diaphragm 18 and snap switch 19 arranged to connect and disconnect the wires 20. The above described elements are illustrative and are more particularly described in my co-pending application S. N. 183,480 filed April 13, 1927. A pulley 22 is connected to the shaft 23 of the motor or driving member 21. The belt 24 connects the pulley 22 with the pulley 25 of the compressor or driven member. A motor support or base 26 maintains the motor 21 upon the shaft 27. This shaft is yieldingly mounted in the rubber bushing 28 which is in turn mounted upon the supporting plate 29 on the platform 10. As disclosed in the drawing the motor 21 is thus preferably mounted in unstable equilibrium and is further mounted slightly off center away from the compressor so that it will tilt away from the compressor and keep the belt 24 tight. A spring 30 aids in tilting the motor away from the compressor. An arc of metal constituting a braking surface 31 is attached to the driving member 21. This braking surface may take any form and may be attached at any convenient place to the casing of the motor or any other suitable place of attachment. It has been found to be convenient from the manufacturing standpoint to make the braking surface 31 integral with the motor support or base 26. As disclosed in the drawing the members 31 and 26 form substantially a figure 2 and are attached to the motor casing by the screws 43 and 41 and to the shaft 27 by the screw 42. The braking surface 31 however need not be integral with that of 26 and may be entirely disconnected from it. A brake shoe 32 having a brake lining 33 riveted or otherwise attached to it bears against the surface 31. If desired the brake lining 33 may be attached to the braking surface 31 or the brake lining may be attached to both 31 and 32. The brake shoe 32 is preferably held in contact with the braking surface 31 by a rod 34 constituting a brake shoe support. As disclosed in the drawing the brake shoe 32 is preferably loosely supported on the head 37 of the brake shoe support by being pivoted on a projection 36 of the head 37 projecting into the depression 35 in the shoe 32. The adjusting screw 38 on the other side of the axis of the rod from the pivoting points 35—36 maintains the upper part of the brake shoe against the braking surface 31. The arc 31 is preferably so chosen that movement of the motor away from the compressor will loosen the engagement of the arc 31 with the brake lining on the shoe 32. Movement of the motor 21 towards the compressor will be prevented because such movement would necessitate movement of the braking surface 31 against the pressure of the brake shoe 32. The rod 34 is preferably mounted in a tube 39 and is maintained in an advanced position by the spring 40 in the tube.

It is obvious that maintaining the belt 24 of refrigerating apparatus tight will increase the efficiency of the transmission between the driving and driven members. Prevention of slack in the belt will also result in more quiet operation of the apparatus. Due to the pivoting of the motor off center in unstable equilibrium and the pressure of the spring 30, the motor 21 will be always tilted away from the compressor to the full extent allowed by the belt 24. Any jolt or general tendency to tilt the motor 21 towards the compressor will be opposed by the brake shoe 32 coming into tighter engagement with the braking surface 31. It is to be noted that the pressure of the surface 31 against the brake shoe 32 when the motor is moving is in a substantially tangential direction to the surface of the shoe 32. Such pressure is transmitted to and opposed by the sides of the tube 39. The spring 40 exerts pressure against the braking surface 31 in substantially a normal direction to such surface.

While the form of embodiment of the invention as herein described constitutes a preferred form, it is to be understood that other forms might be adopted, all coming within the scope of the claims which follow.

What is claimed is as follows:

1. In a refrigerating apparatus, a driving member, a driven member, belt means operatively connecting said members, one of said members being yieldingly mounted, a brake surface attached to said last mentioned member, a brake shoe opposing movement of said yieldingly mounted member towards said other member and bearing against said brake surface and supporting means for said brake shoe urging said brake shoe against said brake surface.

2. In a refrigerating apparatus, a driving member, a driven member, belt means operatively connecting said members, one of said members being yieldingly mounted, a brake surface attached to said last mentioned member, a brake shoe opposing movement of said yieldingly mounted member towards said other member and bearing against said brake surface and supporting means for said brake shoe urging said brake shoe against said brake surface, said brake shoe being adjustably supported in respect to said brake surface upon said supporting means.

3. In a refrigerating apparatus, a driving member, a driven member, belt means operatively connecting said members, a support for one of said members, said support being yieldably mounted, a braking surface upon said support and means cooperating with said braking surface to prevent movement of said members toward each other, said last mentioned means comprising a friction surface bearing against said braking surface and spring means maintaining said friction means in contact with said braking surface.

4. In a refrigerating apparatus, a driving member, a driven member, belt means operatively connecting said members, one of said members being yieldably mounted, a braking surface connected to said last mentioned member, a friction surface bearing against said braking surface, and means to maintain said friction surface in constant contact with said braking surface.

5. In a refrigerating apparatus, a driving member, a driven member, belt means operatively connecting said members, one of said members being yieldably mounted, a braking surface connected to said last mentioned member and a friction surface bearing against said braking surface, said friction surface being adjustably pivoted.

6. In a refrigerating apparatus, a driving member, a driven member, belt means operatively connecting said members, one of said members being yieldably mounted, a braking surface connected to said last mentioned member, a friction surface bearing against said braking surface, and means to maintain said friction surface in constant contact with said braking surface, said last mentioned means comprising a spring pressed rod.

7. In a refrigerating apparatus, a driving member, a driven member, belt means operatively connecting said members, one of said members being yieldably mounted, a braking surface connected to said last mentioned member, a friction surface bearing against said braking surface, and means to maintain said friction surface in constant contact with said braking surface, said last mentioned means comprising a spring-pressed rod, said friction surface being pivoted on said rod.

8. In a refrigerating apparatus, a driving member, a driven member, belt means operatively connecting said members, one of said members being yieldably mounted, a braking surface connected to said last mentioned member, a friction surface bearing against said braking surface, means to maintain said friction surface in constant contact with said braking surface, said last mentioned means comprising a spring-pressed rod, said friction surface being pivoted on said rod, and an element connected to said rod and adjusting the position of said friction surface.

9. In a refrigerating apparatus, a driving member, a driven member, belt means operatively connecting said members, one of said members being yieldably mounted, a braking surface connected to said last mentioned member and a friction surface bearing against said braking surface, said braking surface being in the form of an arc.

10. In a refrigerating apparatus, a driving member, a driven member, belt means operatively connecting said members, one of said members being yieldably mounted, a braking surface connected to said last mentioned member and a friction surface bearing against said braking surface, said friction surface allowing tangential movement of said braking surface in one direction and opposing such tangential movement in another direction.

11. In refrigerating apparatus, a driving member, a driven member, and belt means connecting said members, one of said members being yieldingly mounted, a braking surface, a brake shoe having a surface bearing against said braking surface, one of said surfaces being attached to said yieldingly mounted member, and supporting means for the other of said surface urging other of said surfaces against said surface attached to the yieldingly mounted member.

12. In refrigerating apparatus, a driving member, a driven member, and belt means operatively connecting said members, one of said members being yieldingly mounted to move away from the other of said members, a braking surface, a brake shoe having a surface bearing against said braking surfaces, one of said surfaces being associated with said yieldingly mounted member, and means urging the other of said surfaces against the surface associated with said yieldingly mounted member.

In testimony whereof I hereto affix my signature.

HARRY B. HULL.